United States Patent [19]

Horzepa et al.

[11] 3,925,257
[45] Dec. 9, 1975

[54] SULFUR RECOVERY CATALYST AND PRODUCTION THEREOF FROM BAUXITE ORE

[75] Inventors: John P. Horzepa, Edison; David B. Swanson, Cranford, both of N.J.

[73] Assignee: Engelhard Minerals & Chemicals Corporation, Edison, N.J.

[22] Filed: Mar. 21, 1974

[21] Appl. No.: 453,333

[52] U.S. Cl. ................................ 252/463; 423/576
[51] Int. Cl.² ........................................ B01J 23/08
[58] Field of Search ................... 252/463; 423/576

[56] References Cited
UNITED STATES PATENTS

| | | | |
|---|---|---|---|
| 2,952,644 | 9/1960 | Holden | 252/465 |
| 3,173,883 | 3/1965 | Cornelius et al. | 252/463 X |
| 3,222,297 | 12/1965 | Allegrini et al. | 252/463 X |
| 3,228,891 | 1/1966 | Duke | 252/463 X |
| 3,317,277 | 5/1967 | Cosgrove | 252/463 X |

*Primary Examiner*—W. J. Shine
*Attorney, Agent, or Firm*—Melvin C. Flint; Inez L. Moselle

[57] ABSTRACT

Ground calcined bauxite ore fines are dry mixed with powdered colloidal boehmite alumina (alpha alumina monohydrate). The mixture is moistened with a solution of an acid capable of peptizing the boehmite alumina and formed into particles by extrusion. The particles are then dried and calcined.

5 Claims, No Drawings

SULFUR RECOVERY CATALYST AND PRODUCTION THEREOF FROM BAUXITE ORE

BACKGROUND OF THE INVENTION

1. Field of the Invention

The invention relates to the production of mechanically strong shaped aggregates of heat-activated bonded bauxite fines, which possess utility as the catalyst in the known Claus process for producing sulfur from hydrogen sulfide gas. In particular, the invention relates to a process for binding ground bauxite ore with colloidal alumina to produce an alumina-bonded bauxite catalyst.

Bauxite ores are a naturally occurring source of alumina. The ores contain one or more hydrates of alumina (frequently gibbsite, which is alpha alumina trihydrate). The ores invariably contain ferruginous and siliceous impurities, especially quartz. Typical uncalcined commercial bauxite ores analyze (dry weight basis) from about 50 percent to 60 percent by weight $Al_2O_3$, from 1 percent to 15 percent $SiO_2$, and from about 25 percent to 30 percent volatile matter. The term "volatile matter" (V.M.) is described in U.S. Pat. No. 3,406,125 to Allegrini and Cecil.

It is well known that heat-activated (calcined) bauxite ore is effective as a catalyst for the Claus process. The production of the commercially used catalytically active material involves crushing the naturally-occurring ore, heating the ore under preselected conditions of time and temperature, known in the art, crushing the calcined ore and screening the crushed particles to recover small, irregularly shaped pieces or chunks of desired size. While the product obtained by this technique possesses acceptable catalytic activity, the particles lack the mechanical strength of some commercially available synthetic alumina catalysts. Thus, the bauxite catalysts obtained by calcining and sizing whole bauxite ore may break down into fines when the particles are handled in pneumatic conveyors which are utilized in some Claus sulfur recovery plants. Further, sulfur recovery catalyst particles obtained by sizing activated whole ore tend to pack when placed in some catalytic reactors. This will result in an undesirable increase in pressure drop across a catalyst bed which is avoided by the use of shaped particles, such as the commercially available synthetic alumina products.

Many attempts have been made to produce hard shaped aggregates of activated bauxite by binding ground ore. These attempts have generally involved mixing suitably ground ore, frequently precalcined ore, with a solution of binder material, utilizing a muller or pug mill to effect the mixing. This is followed by particle formation, e.g., extruding the mixture of ground ore and binder solution through a die plate to form strands which are then cut into pellets of a desired size. The green pellets are then heat treated to set the binder. In most cases the dried pellets are calcined. Prior art binders have included, inter alia, various acids, mixtures of acids, sodium silicate and sodium hydroxide solutions. Some of the binders have resulted in the provision of pellets having acceptable hardness for pneumatic handling. However, the bonded bauxite products were less active in sulfur recovery units than catalyst particles obtained from the whole ore (self-bonded). The loss of activity was attributable to presence of residues of binder substances in the bonded bauxite products.

While bauxite is considerably cheaper than the synthetic aluminas used in producing shaped catalysts for the Claus process, to the best of our knowledge it was not possible, prior to our invention, to produce a mechanically strong pelletized product from bauxite fines which possessed catalytic activity comparable to that of crushed activated whole ore or synthetic alumina catalysts.

In our initial attempts to pelletize bauxite fines with binders which would not leave undesirable residues, we sought to employ colloidal boehmite alumina (alpha alumina monohydrate) as the binding agent. This particular type of alumina was selected because it is a known binding agent for ceramic and certain catalyst particles and because it would be expected to leave no undesirable residue in a pelletized bauxite product.

In the initial efforts the alumina was handled in the manner conventional for utilizing colloidal boehmite alumina as a binding agent. This involved intensively shearing dry powdered boehmite alumina in a Cowles Dissolver with water in the presence of an acid which served to peptize the colloidal alumina particles. This resulted in the production of a viscous gel which was then mixed with ground bauxite ore. In batch-scale laboratory tests, prolonged mixing was required to obtain a mixture having a consistency suitable for extrusion through a die plate to form pellets. Considerable difficulty was experienced in translating the small batch laboratory scale extrusion to a continuous commercial scale operation. More particularly, it was found that mixes of ground ore (preactivated) and peptized alumina gels that were sufficiently moist to be extruded through a die plate and contained enough boehmite to produce pellets of adequate hardness tended to cling to the auger of an extruder instead of progressing down the auger into contact with the die plate. On the other hand, when the mixtures were sufficiently dry to move down the auger, excessive pressures were required to move the mixes through the die plate. This resulted in bending of the die plate in some cases. In others the power requirements of the machine were exceeded.

Another problem was encountered in attempts to adapt the well-known colloidal alumina binders to the production of bonded bauxite catalyst pellets. In order to obtain pellets of acceptable hardness, it was necessary to use an expensive, extremely finely divided grade of high purity boehmite alumina. A less costly grade of coarser boehmite resulted in finished catalyst particles of unsatisfactory hardness.

2. Prior Art

High purity colloidal boehmites are known binding materials and extrusion aids for ceramics. The earliest product, supplied under the name "Baymal" was fibrous. More recently, nonfibrous boehmite products have become available. The latter are supplied as "Dispal M," "Catapal N" and "Catapal SB." The instructions provided by the supplier of these products call for intensively mulling the alumina products with acidified water to produce acid-peptized viscous gels prior to mixing the products with other solids and extruding the mixtures.

U.S. Pat. No. 3,557,024, "Alumina-Bonded Catalysts," Young et al, relates to the use of acidified boehmite as a binder for catalyst particles, the catalyst particles being "siliceous" in nature, e.g., zeolitic molecular sieves or activated clay. The boehmite, which must be of high purity and essentially free of other aluminas, is first mixed with water and at least 0.5 equivalent acid per mole of boehmite to form a gel which is then mixed with the catalyst particles. U.S. Pat. No. 3,652,449 to the same inventors contains a similar disclosure.

U.S. Pat. No. 3,326,818, "Catalyst Composition of a Crystalline Aluminosilicate and a Binder," Gladrow et al, discloses the utility of acid-peptized alumina as a preferred binder for molecular sieve zeolites.

U.S. Pat. No. 3,357,791, "Process For Producing Colloidal-Size Particles of Alumina Monohydrate" to Napier, describes the production of high purity colloidal boehmite by hydrolyzing an aluminum alkoxide.

The following patents pertain to the production of catalysts or catalyst carrier by binding ground bauxite with various aluminum-containing substances.

U.S. Pat. No. 2,662,860, "Method For the Production of Molded Alumina Carrier and Catalyst," Engel et al, describes an activated alumina-bonded bauxite catalyst obtained by mixing ground uncalcined bauxite ore with aluminum chloride and water, heating to liberate water and hydrolyze the salt, followed by calcination to produce a product useful in the Claus sulfur conversion process.

U.S. Pat. No. 3,011,980, "Activated Bauxite and Catalyst Containing Same," to Bell concerns the production of an activated bauxite catalyst in the form of spherical nodules by a process including the steps of controlled dehydration of finely ground hydrated alumina, controlled moistening with water and rehydration, tumbling and calcination.

THE INVENTION

One aspect of the present invention involves a novel bauxite catalyst, useful as a sulfur recovery catalyst, which comprises mechanically strong aggregates composed of a major weight percentage of particles of heat-activated bauxite fines cemented together with a minor weight percentage of porous dehydrated colloidal boehmite alumina.

Another aspect of the invention involves a novel method for producing a sulfur recovery catalyst from bauxite ore. In accordance with this aspect of the invention, partially dehydrated particles of bauxite ore in the form of small granules, generally termed "bauxite fines," are first thoroughly mixed with a minor weight percentage of dry, powdered boehmite alumina, thereby coating the boehmite on the surface of the particles of bauxite. The bauxite particles containing the added boehmite alumina are then thoroughly mixed with an aqueous solution of an acid capable of peptizing the boehmite, such as hydrochloric. Sufficient acid solution is employed to form a plastic mixture with the partially dehydrated bauxite fines and added boehmite alumina. The amount of acid in the solution is small, sufficient to peptize the boehmite alumina. The plastic mixture is formed into aggregates of desired size and shape, preferably by extrusion, to form green pellets. The green aggregates are then hardened by a heat treatment, preferably involving an initial drying stage, followed by calcination. The heat treatment removes physically held water from the aggregates and dehydrates the boehmite, converting it into an activated porous alumina.

From the brief description of our invention taken in light of the prior art, it is apparent that we have successfully produced a colloidal boehmite alumina-bonded bauxite catalyst by departing from the manipulative steps conventionally employed when utilizing colloidal boehmite as a binder. Thus, we avoid the conventional technique of pregelling the boehmite with acid solution before mixing the boehmite with the solids to be bonded. Instead we add the boehmite powder to the material being bonded while both are dry and thereafter add an acid solution. This departure from prior art practice has spelled the difference between success and failure.

DETAILED DESCRIPTION

The bauxite ore used in carrying out the invention should be a gibbsite ore, i.e., an ore containing appreciable alpha alumina trihydrate. Such ores are mined in South and North America as well as South Africa. Analyses of typical gibbsite ores appear in "Minerals For the Chemical and Allied Industries," S. J. Johnstone and M. G. Johnstone, Second Edition, page 6, published by John Wiley & Sons, Inc., 1961.

In carrying out the invention, the bauxite ore should be calcined to a V.M. appreciably below 25 percent, preferably to a V.M. in the range of about 5 percent to 15 percent. Excellent results were obtained with an ore calcined to a V.M. of about 10 percent. Calcination temperatures in the range of about 500°F. to 1,000°F. may be used to preactivate (partially dehydrate) the ore to a desired water content.

Typical surface area (B.E.T.) of the activated bauxite ore we use as a starting material is about 200 $m^2/g$. Reference is made to U.S. Pat. No. 3,406,125 for its disclosure relative to the method for determining surface area by the well-known B.E.T. method.

The activated ore should be in the form of fines, i.e., particles 30 mesh (Tyler) or finer, for example minus 325 mesh. The fines are produced by grinding and sizing whole ore prior or subsequent to calcination. Preferably, the ore is put into the form of fines before thermal activation because of reduced wear on grinding equipment when uncalcined ore is being handled. It is within the scope of the invention, however, to heat-activate crushed ore and then grind the ore to produce the required calcined fines.

The colloidal boehmite alumina is employed in the form of a dried powder. High purity boehmite is recommended. Nonfibrous boehmite is suitable. Fibrous boehmite such as products similar to the fibrous boehmite formerly available under the trade name "Baymal" may be used. The dried boehmite powder products are composed of particles which may be, for example, about 50 percent by weight finer than 200 mesh or 50 percent by weight finer than about 325 mesh (45 microns). These particles actually are agglomerates of submicron size crystals of boehmite. In other words, the ultimate size of the crystals is in the submicron size range, typically about 0.005 microns. These ultimate crystals are formed when the boehmite alumina powders are mixed with water and a suitable acid is used to peptize the dispersion.

Representative commercially available nonfibrous boehmite products include "Dispal M" and "Catapal SB." These are high purity boehmite alumina products obtained as a co-product with ALFOL alcohols in the so-called "CONOCO alumina process." In carrying out this process aluminum triethyl is obtained by reaction of high purity aluminum, hydrogen and ethylene. The aluminum triethyl is polymerized with additional ethylene. The resulting aluminum alkyls are oxidized to form aluminum alkoxides which are hydrolyzed to produce boehmite alumina and alcohols which are separated from the alumina. The alumina is dried under mild conditions. Following are published properties of these boehmite products.

|  | "Dispal M", % | "Catapal SB", % |
|---|---|---|
| Typical Chemical Composition, Wt. | | |
| Alpha alumina monohydrate (boehmite) | 90 | 75 |
| Water | 9 | 25 |
| Carbon (as primary alcohol) | 0.5 | 0.3 |
| $SiO_2$ | 0.008 | 0.008 |
| $Fe_2O_3$ | 0.005 | 0.005 |
| $Na_2O$ | 0.004 | 0.004 |
| S | 0.005 | 0.01 |
| Typical Physical Properties | | |
| Surface area * (B.E.T.) | 320 m²/g. | 250 m²/g. |
| Particle size | | |
|   Powder (by sieving) | 15% > 45 microns | 11% > 90 microns |
| | 85% < 45 microns | 48% < 45 microns |
|   Ultimate crystals (by X-ray diffraction) | 0.0048 micron | 0.0065 micron |
|   Loose bulk density | 45 lb./ft.³ | 45 lb./ft.³ |

*After calcination for 3 hours at 900°F.

The use of an acid in conjunction with colloidal boehmite is essential although only small quantities of acid are required. Products having unsatisfactory hardness are obtained when acid is not used. The amount of acid used is not critical. An excess over the amount required to peptize the boehmite, e.g., 0.1 equivalent acid per mole alumina monohydrate, will generally be of no perceptible benefit.

Any acids useful in peptizing gels of boehmite alumina may be employed. These acids are well known in the art. The acid is used in amount within the range of about 0.1 to 0.2 equivalents per mole boehmite. Reference is made to the disclosure in U.S. Pat. No. 3,357,791. Acid species include hydrochloric, acetic, nitric, propionic, formic and chloroacetic. For economic and practical reasons we prefer to use hydrochloric acid. When hydrochloric acid is used, essentially all of the chloride remains in the calcined product. Calcination and other processing steps are carried out at temperatures in which metal chlorides have low volatility.

Following are typical proportions of ingredients:

|  | Parts by Weight, Moisture-Free Basis |
|---|---|
| Calcined bauxite fines | 100 |
| Colloidal boehmite alumina powder | 5–30, preferably 10 to 25 |
| Acid (100% acid basis) | 0.2 to 2, preferably about 0.4 |

Water is employed in quantity sufficient to form a mixture of boehmite and activated bauxite fines that is plastic and amenable to forming. The amount of water used will vary with the forming method used as well as the size and nature of the particles of bauxite and boehmite and the relative proportions of boehmite and bauxite. Using the preferred forming method, i.e., extrusion, the amount of water added is typically sufficient to produce a plastic mixture having a V.M. of about 35 percent, e.g., in the range of 33 percent to 37 percent.

Any equipment capable of thoroughly blending dried activated bauxite fines with the boehmite powder may be used.

The acid may be added as a concentrated solution or the acid solution may be diluted with the water needed for forming prior to adding the acid to the mixture of colloidal boehmite and bauxite fines. We prefer to dilute the acid with water before adding the acid to the dry blend and, when necessary, incorporate additional water before forming particles.

A pug mill or muller is recommended for mixing the acid solution with the premixed boehmite alumina powder and calcined bauxite fines. The mixing and forming is conveniently carried out in an auger extruder provided with suitable outlets at the discharge end. Especially recommended for both mixing and extrusion is an extruder of the pin barrel type. The commercially available Bonnot Pin Barrel Extruder is suitable. One model which has been successfully employed has a 4-inch continuous auger, 3-inch pitch in the barrel and 4-inch pitch in the feed chamber. A total of 4 pins is on one side of the barrel. The machine has a 10 hp. variable speed (0-60 r.p.m.) drive. A die plate which was successfully used has a ½-inch land with 5/16-inch holes.

After extrusion the pellets can be cut to suitable lengths, e.g., 1/16-inch to 5/16-inch, to produce cylindrical pellets.

The pellets can be dried in a directly or indirectly heated oven or drier at about 250°F. to 375°F. for a time within the range of about 15 minutes to 2 hours followed by calcination at a temperature in the range of about 500°F. to 800°F., preferably at about 600°F. to 700°F. Typical V.M. of the calcined pellets is in the range of 5 percent to 12 percent.

The pelleted catalyst of the invention has a hardness value, when tested by the so-called "4-ball" test method, of at least 90 percent. The 4-ball test method is described in U.S. Pat. No. 3,078,518 to Robinson and Haden.

Typical B.E.T. surface area of a catalyst product of the invention is in the range of 150 to 300 m²/g.

The following examples are given for illustrative purposes.

EXAMPLE I

Test No. 1

In accordance with this invention, 500 g. bauxite fines (−325 mesh, Tyler, activated at 500°F. to a V.M. of 7.8 percent) was charged to a sigma blade pug mill. "Dispal M" was added in amount of 71.1 g. (12.6 percent dosage, i.e., 12.6 g. of boehmite alumina per 100 g. of finished catalyst). The mixture was blended in the pug mill for 5 minutes. A hydrochloric acid solution (5.6 g. of 37 percent HCl diluted with 108 g. water)

was added to the charge in the mill. The amount of acid corresponds to about 0.1 equivalent HCl per mole boehmite in the "Dispal." The mixture was pugged for 4 minutes and an additional 105 ml. of water added to produce a mixture of extrudable consistency. Total pugging time was 10 minutes. The mixture was readily extruded in a piston extruder using a 1-inch land and a 5/16-inch die. The extrudate was cut into pellets which were dried for 2 hours in a Despatch oven at 350°F. and then calcined in a muffle oven at 700°F. for 1 hour.

The results of Tests 1 through 7 are reported in Table I. In all cases the pellets were screened on a 4-mesh (Tyler) screen before testing hardness by the 4-ball method for 1 hours. A 5-mesh limiting screen was used in computing hardness.

COMPOSITION OF EXTRUDED PELLETS

| Test No. | Bauxite Mesh Size | Alumina Monohydrate Binder Dosage, | HCl Equivalent per Mole Alumina Monohydrate In Binder | V.M. of Undried Pellets | Hardness of Heat-treated * Pellets, % |
|---|---|---|---|---|---|
|  |  | "Dispal M" |  |  |  |
| 1 | −325 | 12.6 | 0.1 | 34.0 | 92 |
| 2 | −325 | 12.6 | 0.2 | 32.9 | 93 |
| 3 | −325 | 12.6 | 0 | 35.0 | 53 |
|  |  | "Catapal SB" |  |  |  |
| 4 | −60 | 12.6 | 0.1 | 33.6 | 93 |
| 5 | −325 | 12.6 | 0.1 | 33.8 | 92 |
| 6 | −325 | 16.4 | 0.1 | 35.1 | 94 |
| 7 | −325 | 0 | 0.1 | 33.8 | 6 |

* = Dried 350°F. for 2 hours followed by 700°F. for 1 hour

Test No. 2

Same as Test No. 1 except the amount of 37 percent HCl used was increased to 11.2 g., corresponding to about 0.2 equivalent per mole boehmite in the binder.

Test No. 3

Same as No. 1 except no acid was added. This test was carried out to demonstrate the necessity for using acid along with colloidal boehmite.

Test No. 4

Similar to Test No. 1 except the starting ore was minus 60 mesh fines activated to a V.M. Of 7.0 percent and the binder was "Catapal SB." The charge to the pug mill was 500 g. bauxite, 71.1 g. "Catapal SB" and 5.6 g. of 37 percent HCl diluted with 108 grams water, followed by additional water to provide a mixture possessing an extrudable consistency.

Test No. 5

This was a repeat of Test No. 4 using minus 325 mesh preactivated bauxite ore having a V.M. of 9.8 percent.

Test No. 6

The charge was 500 g. bauxite ore (minus 325 mesh at 19.8 percent V.M.), 94.8 g. "Catapal SB" (16.4 percent dosage) and 7.5 g. of 37 percent HCl diluted with 108 g. water. The Catapal and bauxite fines were mixed dry for 12 minutes, followed by addition of the acid solution, pugging for 4 minutes, addition of 55 cc. water, and pugging for about 5 minutes, addition of 50 cc. water. Total pugging time after addition of acid was 15 minutes.

Test No. 7

This test was carried out to demonstrate the necessity for using boehmite along with acid. Five hundred grams of minus 325 mesh ore at 9.8 percent V.M. was mixed with 5.6 g. of 37 percent HCl and 195 g. water in the pugger for 10 minutes, extruded, dried and calcined as in Test No. 1.

The results of the tests which are reported in the table show that products having the desired hardness were obtained by dry mixing minus 60 mesh or minus 325 mesh activated bauxite fines with colloidal boehmite, acidifying the mixture, extruding and calcining the pellets in accordance with the invention. The data show production of pelleted bauxite fines having a hardness of 90 percent or more required the use of both colloidal boehmite and acid. The data show also that the use of more than 0.1 equivalent acid per mole boehmite did not bring about a perceptible improvement in hardness.

EXAMPLE II

In another test in accordance with the invention, −60 mesh bauxite ore activated to 8 percent V.M. was used with a 16.4 percent dosage of "Catapal" (18.9 lbs. Catapal per 100 lbs. bauxite fines), 7.8 lbs. HCl per 100 lbs. Catapal (0.1 equivalent HCl per mole boehmite in Catapal) and water to produce a mix having a V.M. of 34.5 percent. Total pugging time after mixing the bauxite fines with dry colloidal boehmite was 14 minutes. The catalyst product had a hardness of 92 percent.

In still another test, preactivated minux 325 mesh bauxite (8.0 percent V.M.) was used with a "Catapal" dosage of 26.1 percent (33.1 lbs. Catapal per 100 lbs. bauxite fines) and 10.6 lbs. HCl per 100 lbs. Catapal). Pugging time was 10 minutes after adding the acid solution to the dry mixture of Catapal and bauxite fines. A product having a 94 percent hardness was obtained. The power demand on the extruder was only 21.9 kilowatt hours per ton.

EXAMPLE III

A test similar to those conducted in Example I was carried out utilizing the 4-inch auger Bonnot Pin Barrel extruder above described for mixing ingredients and extruding the mixture into pellets. In the test, "Catapal" (18.25 lbs.) was dry blended with 100 lbs. of activated bauxite fines, followed by addition of 1.43 lbs. of 37 percent HCl diluted with 40.1 lbs. of water. Extrusion was carried out with an auger speed of 15 r.p.m. The die plate had 5/16-inch holes and a ½-inch land. The extrudate was cut into pellets about 5/16-inch long as they issued from the extruder. The pellets were dried at 350°F. for 2 hours and activated at 700°F. for 1 hour. Hardness was 90 percent.

An attempt was made to bind the minus 325 mesh activated bauxite fines with a 12.6 percent dosage of Catapal by utilizing the conventional technique for handling Catapal (pregelling the Catapal, utilizing hydrochloric acid as peptizing agent, and adding the gel to the bauxite fines). The attempt was unsuccessful since the mixture could not be extruded. Similarly, an extrudable mixture could not be obtained with a 26.1 percent dosage of Catapal when using the conventional technique of pregelling the Catapal.

We claim:

1. A method for making a catalyst which comprises forming a mixture consisting of a major weight percentage of dry calcined bauxite fines and a minor weight percentage of dry powdered hydrous colloidal boehmite alumina, adding an aqueous solution of an acid capable of peptizing boehmite alumina to the resulting dry mixture of calcined bauxite fines and boehmite alumina with thorough mixing, the acid solution being used in amount sufficient to form a plastic mixture, forming the plastic mixture into particles of desired size and shape, drying and calcining the particles.

2. The method of claim 1 wherein the acid is used in amount within the range of about 0.1 to 0.2 equivalents per mole boehmite.

3. The method of claim 2 wherein the acid is hydrochloric.

4. A method for making a sulfur recovery catalyst which comprises providing dry bauxite fines calcined at a temperature in the range of 500°F. to 1,000°F. to a V.M. in the range of 5 percent to 15 percent, mixing the fines with from about 5 percent to 30 percent by weight of dry powdered high purity colloidal boehmite alumina, thereby forming a dry mixture consisting of bauxite fines and high purity colloidal boehmite alumina, adding to said mixture a solution of hydrochloric acid to provide about 0.2 to 2 percent HCl based on the dry weight of said bauxite, thoroughly pugging the mixture in an auger extruder wherein pins extend from the periphery of the barrel of the auger, adjusting the moisture content of the mixture to a value in the range of about 33 to 37 percent by addition of water, extruding the mixture through a die plate at the discharge end of the extruder, drying the resulting extruded pellets and calcining the dried pellets at a temperature in the range of about 500° F. to 800°F.

5. The method of claim 4 wherein said boehmite alumina is used in amount within the range of 10 percent to 25 percent based on the weight of the bauxite fines and the acid is used in amount of about 0.4 percent based on the weight of the bauxite fines.

* * * * *